(12) United States Patent
Stoy et al.

(10) Patent No.: US 7,241,393 B2
(45) Date of Patent: Jul. 10, 2007

(54) METHOD AND APPARATUS FOR SEPARATING SOLIDS FROM A SLURRY

(75) Inventors: James R. Stoy, Houston, TX (US); Lee D. Rhyne, Katy, TX (US); Ming He, Houston, TX (US); Lalit S. Shah, Sugar Land, TX (US)

(73) Assignee: Texaco Inc., San Ramon, CA (US)

( * ) Notice: Subject to any disclaimer, the term of this patent is extended or adjusted under 35 U.S.C. 154(b) by 195 days.

(21) Appl. No.: 10/721,451

(22) Filed: Nov. 24, 2003

(65) Prior Publication Data

US 2005/0109715 A1    May 26, 2005

(51) Int. Cl.
*B01D 21/26* (2006.01)
*C02F 1/38* (2006.01)

(52) U.S. Cl. .................. 210/788; 210/808; 210/188; 210/512.1; 209/720; 209/726; 209/733; 55/459.1

(58) Field of Classification Search ............ 210/741, 210/742, 774, 788, 806, 808, 180, 188, 194, 210/259, 294, 416.1, 512.1, 778, 805; 209/12.1, 209/720, 726, 733; 55/459.1; 95/258
See application file for complete search history.

(56) References Cited

U.S. PATENT DOCUMENTS

| | | | |
|---|---|---|---|
| 3,439,650 A * | 4/1969 | Stowell | ............. 209/30 |
| 4,134,828 A | 1/1979 | Trawinski | |
| 4,144,087 A | 3/1979 | Chwalek et al. | |
| 4,174,275 A | 11/1979 | Martin | |
| 4,226,726 A | 10/1980 | Rehm | |
| 4,283,232 A | 8/1981 | Best | |
| 4,303,526 A | 12/1981 | Moro et al. | |
| 4,670,161 A * | 6/1987 | Hayatdavoudi | ......... 210/512.1 |
| 4,797,203 A | 1/1989 | Macierewicz | |
| 4,810,264 A | 3/1989 | Dewitz | |
| 4,859,347 A | 8/1989 | Simon et al. | |
| 5,186,823 A * | 2/1993 | Robinson | ............ 210/512.1 |
| 5,273,647 A | 12/1993 | Tuszko et al. | |
| 5,900,159 A * | 5/1999 | Engel et al. | ............. 210/788 |
| 6,068,760 A | 5/2000 | Benham et al. | |

(Continued)

*Primary Examiner*—David A. Reifsnyder
(74) *Attorney, Agent, or Firm*—Frank C. Turner; Melissa Patangia (57) ABSTRACT

Method and apparatus for separating components of a slurry comprising solid particles and liquid components, particularly where the slurry is under pressure. The components are separated in a hydrocyclone such that a solids-enriched slurry exits the separator via an underflow outlet while a solids-depleted slurry exits the separator through an overflow outlet and passes into a products vessel. Fluid communication is provided between the products vessel and the underflow outlet so that gas can circulate through the hydrocyclone. This gas circulation pathway may be achieved by enclosing the separation system in a housing or providing a gas circulation conduit between the products vessel and the underflow outlet of the separator or an optional solids vessel connected to the underflow outlet. Pressure within the separator apparatus may be adjusted and controlled at a negative, neutral or positive pressure while operating the hydrocyclone in balanced mode to achieve efficient separation. Where the slurry is derived from a high pressure and/or high temperature reactor and the solid components of the slurry include catalyst particles that are to be reclaimed and recycled to the reactor, the separator apparatus is preferably operated at substantially the same pressure that is found in the reactor.

6 Claims, 2 Drawing Sheets

U.S. PATENT DOCUMENTS 6,096,789 A   8/2000   Clerici et al.
6,348,510 B1  2/2002   Maretto et al.
2002/0161060 A1  10/2002  Ketley et al.
2002/0183403 A1  12/2002  Huang et al.

* cited by examiner

METHOD AND APPARATUS FOR SEPARATING SOLIDS FROM A SLURRY

FIELD OF THE INVENTION

The present invention relates to a method and apparatus for separating components of a slurry comprising solid particles and liquid components, particularly where the slurry is under pressure. In a further aspect, the present invention relates to the use of such a method in a process for the preparation of hydrocarbons that comprises contacting a mixture of hydrogen and carbon monoxide in a three-phase slurry reactor with a slurry of solid catalyst particles and liquid.

BACKGROUND OF THE INVENTION

Three-phase slurry reactors are well known to those skilled in the art. Typical examples of chemical processes that are carried out in three-phase slurry reactors are those which make use of solid catalyst particles, use at least one gaseous reactant, and produce a product that is liquid under reaction conditions. Many of such tri-phasic reactions are highly exothermic. Examples of such processes include hydrogenation processes, hydroformylation, alkanol synthesis, the preparation of aromatic urethanes using carbon monoxide, Kolbel-Engelhardt synthesis, polyolefin synthesis, and Fischer-Tropsch synthesis.

Fischer-Tropsch synthesis is a technology for preparing hydrocarbons from mixtures of gases based on hydrogen and carbon monoxide, conventionally known as synthesis gas. A summary of some of the work on the Fischer-Tropsch synthesis reactions is contained in the Bureau of Mines Bulletin, 544 (1955) entitled "Bibliography of the Fischer-Tropsch Synthesis and Related Processes" H. C. Anderson, J. L. Wiley and A. Newell. In general, the Fischer-Tropsch technology is based on the use of a reactor for chemical reactions that are carried out in triphasic systems where the gas phase reactants bubble into a slurry of catalyst solids in liquid. The gas phase consists of synthesis gas, a mixture of hydrogen and carbon monoxide with a molar ratio $H_2/CO$ varying from at least about 0.5 to about 3. The dispersing liquid phase within the reactor comprises reaction products and serves as a heat transfer medium. The solid phase is represented by catalyst solids that may be present in a variety of forms.

The Fischer-Tropsch reaction product that is discharged from the reactor consists of a slurry that must be processed to separate the solid catalyst from the liquid phase reaction products. In addition, in order to maintain the reactor slurry at a constant level and to maintain a desired volume of activated catalyst within the reactor, a portion of the slurry can be continuously or intermittently removed from the reactor for separating the catalyst from the liquid reaction products and recycling the separated catalyst to the reactor. However, there are difficulties that are typically encountered in separating catalyst particles from liquid hydrocarbons products. The present invention relates to the separation of catalyst solids from the slurry of hydrocarbons produced by Fischer-Tropsch synthesis. Several methods have been described for separating catalyst particles from Fischer-Tropsch wax. A report on the subject is entitled "Status Review of Fischer-Tropsch Slurry Reactor/Catalyst Wax Separation Techniques" that was prepared for the U.S. Department of Energy, Pittsburgh Energy Technology center by P. Z. Zhou, Burns and Roe Services Corporation, February, 1991. This report described filters, magnetic separators and settling devices, most of which were not successful or were not deemed commercially viable.

BACKGROUND ART

The following relate to a variety of systems and devices for separating hydrocarbon and/or solid components from a slurry: U.S. Pat. No. 4,810,264, issued Mar. 7, 1989, to Dewitz; U.S. Pat. No. 5,900,159, issued May 4, 1999 to Engel, et al.; U.S. Pat. No. 6,068,760, issued May 30, 2000, to Benham, et al.; U.S. Pat. No. 6,096,789, issued Aug. 1, 2000, to Clerici, et al.; U.S. Pat. No. 6,348,510, issued Feb. 19, 2002, to Maretto, et al.; U.S. Patent Application Publication No. 2002/0183403, published Dec. 5, 2002, to Huang, et al.; and U.S. Patent Application Publication No. 2002/0161060, published Oct. 31, 2002, to Ketley, et al.

SUMMARY OF THE INVENTION

The present invention provides an apparatus for separating components of a slurry. The separator apparatus includes a hydrocyclone for receiving a slurry comprising liquid and solid components. The hydrocyclone is a cyclonic separator having a slurry inlet, an underflow outlet, an overflow outlet and an inner wall having a circular cross sectional shape. Preferably, the underflow outlet of the hydrocyclone will comprise an adjustable opening. The separator apparatus further includes a products vessel configured to receive at least a portion of the liquid components and gases from the overflow outlet of the hydrocyclone, and means for providing fluid communication between the products vessel and the underflow outlet of the hydrocyclone. The hydrocyclone will preferably be arranged downstream of a reactor, preferably a hydrocarbon synthesis reactor, for receiving a slurry to be separated.

Means for providing fluid communication can include a common housing enclosing both the hydrocyclone and the products vessel, where the products vessel and the underflow outlet of the hydrocyclone are open to the interior of the housing. Preferably, in such an embodiment, the apparatus will further include means for controlling pressure within the interior of the housing at a desired pressure, and more preferably such means will be capable of maintaining an elevated or positive pressure within the housing.

Optionally, the separator apparatus can include a conduit for providing fluid communication between the overflow outlet of the hydrocyclone and the products vessel, as well as a solids vessel configured to receive a solids-enriched slurry from the underflow outlet of the hydrocyclone and/or a conduit for providing direct fluid communication between the underflow outlet and the solids vessel. Where the separator apparatus includes a conduit for providing fluid communication between the overflow outlet and the products vessel, a solids vessel configured to receive a solids-enriched slurry from the underflow outlet and a conduit for providing fluid direct communication between the underflow outlet and the solids vessel, alternative means for providing fluid communication preferably include a gas circulation conduit connecting the products vessel and the solids vessel. In such an embodiment, the separator apparatus can further include means for adjusting or controlling pressure within the solids vessel, the gas circulation conduit and/or products vessel, and more preferably, such means will be capable of maintaining an elevated or positive pressure therein.

Optionally, the slurry inlet of the hydrocyclone is connected to a reactor, preferably a hydrocarbon synthesis reactor at elevated pressure, for receiving a slurry from the reactor. In addition, the slurry inlet can be connected to a degassing unit for receiving a degassed slurry or a pump for receiving a slurry having an elevated volumetric flow rate.

In a process aspect, the present invention provides methods for separating components from a slurry. The methods include the steps of introducing a slurry comprising liquid and solid components into a hydrocyclone that has an underflow outlet and an overflow outlet, directing the separated liquid components and gases through the overflow outlet and into a products vessel, and providing fluid communication between the products vessel and the underflow outlet. Optionally, but preferably, the slurry is at an elevated pressure preferably at least about 250 psig, elevated temperature preferably between about 250° F. and about 600° F., or a combination thereof.

In an optional, but highly preferred process aspect, the methods of the present invention further include the step of operating the hydrocyclone in balanced mode, particularly when the slurry to be introduced into the hydrocyclone is under elevated pressure. The hydrocyclone can be operated in balanced mode by adjusting the size of the underflow outlet of the separator, by adjusting the volumetric flow rate at which slurry is introduced into the separator, or a combination thereof.

The step of providing fluid communication between the products vessel and the underflow outlet can be achieved by enclosing the underflow outlet of the hydrocyclone and products vessel in a common housing. In such an embodiment, the hydrocyclone is preferably operated in balanced mode. Such methods can further include the step of adjusting pressure within the housing. Where the slurry introduced into the hydrocyclone is at an elevated pressure, the pressure within the housing can be adjusted to the elevated pressure.

The methods of the present invention can further include the step of directing a solids-enriched slurry through the underflow outlet and into a solids vessel. In such an embodiment, the hydrocyclone is preferably operated in balanced mode. The step of balancing pressure in such methods can be achieved by providing fluid communication between the products vessel and the solids vessel. Such methods can further include the step of adjusting pressure within the solids vessel. More particularly, where the slurry introduced into the hydrocyclone is at an elevated pressure, the pressure within the solids vessel can be adjusted to the elevated pressure.

BRIEF DESCRIPTION OF THE DRAWINGS

The invention may be understood by reference to the following description taken in conjunction with the accompanying drawings.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

The separator apparatus of the present invention may be used to separate liquid and solid components from a variety of process streams. However, it is envisioned that the present invention may be of particular use where the slurry stream is at elevated pressure and/or temperature. In a preferred embodiment of the present invention, the separator apparatus can be used to separate liquid hydrocarbons and catalyst solids from a slurry derived from a Fischer-Tropsch hydrocarbon synthesis reactor. Slurries derived from Fischer-Tropsch reactors will likely have a temperature in the range of about 250° F. to about 600° F. and a pressure within the range of about 250 psig and about 700 psig. As described below, it is intended that the apparatus of the present invention will be capable of separating components from a slurry under these conditions.

The separator apparatus of the present invention includes a hydrocyclone for receiving a slurry comprising liquid and solid components. Hydrocyclones suitable for use in the apparatus and methods of the present invention have a slurry inlet, an underflow outlet, an overflow outlet and an inner wall having a circular cross sectional shape. The separator apparatus further includes a products vessel configured to receive a portion of the separated liquid components and gases from the overflow outlet. In addition, the separator apparatus has means for providing fluid communication between the products vessel and the underflow outlet.

Hydrocyclone

Hydrocyclones can be classified as mechanical separation devices in which separation takes place in a centrifugal field. A hydrocyclone operates in a similar way as a tube centrifuge but differs in that a hydrocyclone has a non-rotating body, and the centrifugal field is established by the rotational flow of the feed created by a tangentially directed inlet. A general overview of hydrocyclones is available in Ullmann's Encyclopedia of Industrial Chemistry (1988) Fifth Ed., Vol. B2, pp 11-19 to 11-23.

Hydrocyclones for use in the apparatus and methods of the present invention include an inner wall having a circular cross sectional shape and a slurry inlet oriented to introduce the flow of slurry tangentially so as to maintain the rotational flow of the slurry along the inner wall. In this context, "circular cross sectional shape" should be interpreted to refer to structures that have a circular cross sectional shape in the vicinity of the slurry inlet so as to promote the rotational flow of the slurry. As a result, the general shape of such structures includes sections that are cylindrical, conical, or a combination thereof.

A vortex finder is disposed in the upper section of the hydrocyclone and an overflow outlet is located within the vortex finder to provide an exit for the less dense, lighter components that are separated from the slurry. An underflow outlet in the bottom of the hydrocyclone provides an exit for the heavier more dense components. A more detailed description of hydrocyclones for use with the present invention may be had by reference to U.S. Pat. No. 4,144,087, issued Mar. 13, 1979, to Chwalek, et al.; U.S. Pat. No. 4,226,726, issued Oct. 7, 1980, to Rehm; U.S. Pat. No. 4,283,232, issued Aug. 11, 1981, to Best; U.S. Pat. No. 4,303,526 issued Dec. 1, 1981, to Moro, et al., U.S. Pat. No. 5,273,647, issued Dec. 28, 1993, to Tuszko, et al., the disclosures of which are incorporated herein by reference.

Hydrocyclones typically have a conical lower portion that ends at an apex where the underflow outlet is located. Preferably, the size of the opening in the underflow outlet can be adjusted to enable the operator to more easily operate the hydrocyclone in balanced mode as is described in detail below. Adjustment of the opening of the underflow outlet can be achieved by adjusting the position of a restriction about the outlet opening. Hydrocyclones having an adjustable annular weir may be suitable for this purpose. Descriptions of other adjustable openings may be had by reference to U.S. Pat. No. 4,134,828, issued Jan. 16, 1979, to Trawinski; U.S. Pat. No. 4,174,275, issued Nov. 13, 1979, to Martin; U.S. Pat. No. 4,797,203, issued Jan., 10, 1989, to Macierewicz; and U.S. Pat. No. 4,859,347, issued Aug. 22, 1989, to Simon et al., the disclosures of which are incorporated herein by reference. Any mechanism for adjusting the size of the opening of the underflow outlet may be used to advantage in the apparatus and methods of the present invention provided the mechanism does not inhibit the siphon effect to the extent that a vapor or gas core fails to form within the hydrocyclone.

As noted above, the rotational motion within the hydrocyclone is produced by the slurry entering the hydrocyclone tangentially at an elevated flow rate. The path of the slurry flow spirals down the surface of the cylindrical inner wall at least as far as a stagnation point near the apex. This downward spiral is referred to as the primary vortex. Preferably, the primary vortex will create a siphon effect that draws gas into the hydrocyclone through the underflow outlet at the apex. This in-coming gas forms a central vapor or gas core within the hydrocyclone. The diameter of the vapor core varies with the volumetric flow rate of the slurry. If the flow rate is too low, no vapor core forms and all of the liquid and solids in the slurry leave the hydrocyclone in the stream exiting the underflow outlet. If the feed rate is too high, the vapor core expands closing off the underflow outlet and forcing all of the slurry components to exit the hydrocyclone through the overflow outlet.

Because the underflow outlet is small, the primary vortex is forced to turn upwards near the apex forming a secondary vortex about the vapor core. This secondary vortex rotates in the same direction as the primary vortex but spirals upwardly from the apex towards the top of the hydrocyclone. Phase separation of the slurry takes place in this double vortex flow. The heavier more dense suspended solids migrate outwards toward the outer cylindrical wall of the hydrocyclone where they spiral downward towards the underflow outlet at the apex. This solids-enriched slurry stream exits the hydrocyclone through the underflow outlet opening or underflow nozzle. The opening of the underflow outlet is closed hydraulically by the vapor core and the outflow of the solids-enriched slurry stream. This closure prevents a solids-depleted slurry stream, comprised of lighter less dense liquid components, from exiting the underflow outlet. Rather, the solids-depleted slurry stream is forced to move through the secondary vortex upwards and exit the hydrocyclone via the overflow outlet.

Efficient phase separation is preferably achieved by operating the hydrocyclone in balance mode. "Balanced mode" as used in this context refers to the balance that is achieved between the slurry feed rate and the opening of the underflow outlet so as to create a vapor core and the double vortex flow within the hydrocyclone. Balanced mode can be achieved by adjusting the volumetric flow rate of the slurry feed, adjusting the size of the underflow outlet opening, or a combination thereof to achieve efficient separation. Operation of the hydrocyclone in balanced mode by adjusting these variables is within the skill of one skilled in the use of hydrocyclones.

The selection of a hydrocyclone for use in the apparatus of the present invention, as well as its materials and method of manufacture, should take into consideration the composition, pressure and temperature characteristics of the slurry to be separated therein. Hydrocyclones suitable for use in the apparatus and methods of the present invention may be acquired from a variety of commercial sources, such as Tri-Flo International, Inc. of Conroe, Tex.

Products Vessel

The separator apparatus of the present invention includes a products vessel configured to receive at least a portion of the liquid components that are separated from the slurry and exit the hydrocyclone via the overflow outlet. In addition, at least a portion of gases that are drawn into the hydrocyclone to form the central vapor core also pass through the overflow outlet along with the separated liquid components. The primary function of the products vessel is to collect and degas this mixture of liquids and gases so that the liquid reaction products may be recovered and the gases made available for recycle to the underflow outlet of the hydrocyclone.

The products vessel can be any suitable vessel, tank, or drum that is capable of receiving and containing the liquid components and gases from the overflow outlet. The selected vessel should have sufficient interior volume to allow the liquid and gas components to separate therein. The selection of the products vessel, its materials, and method of manufacture should also take into consideration the materials to be contained therein as well as the anticipated pressure and temperature characteristics of those materials. In a preferred embodiment, a conduit or line is provided to connect the overflow outlet of the hydrocyclone to the products vessel and to provide isolated or direct fluid communication therebetween. In addition, the products vessel will optionally but preferably have a liquid products outlet for removing degassed liquid components from the vessel for subsequent processing and/or use.

In addition, it is known in the art to use hydrocyclones to degas streams of liquids and gases. As such, a hydrocyclone is suitable for use as a products vessel in the separator apparatus of the present invention. In such an embodiment, a first hydrocyclone is used to separate a slurry into a stream of liquids and gases that exits the hydrocyclone via the overflow outlet and a solids-enriched slurry stream that exits the hydrocyclone via the underflow outlet. The stream of liquids and gases is then directed from the overflow outlet of the first hydrocyclone to a second hydrocyclone where the gases are separated from the liquids. The separated gases pass through the overflow outlet of the second hydrocyclone from which they are available for recycle to the underflow outlet(s) of the first and/or second hydrocyclone. In such an embodiment where a hydrocyclone is used as the products vessel, P1 as is described below would refer to the pressure at the overflow outlet of the second hydrocyclone rather than a pressure internal to that hydrocyclone.

Means for Providing Fluid Communication

The separator apparatus of the present invention further includes means for providing fluid communication between the products vessel and the underflow outlet.

In a preferred embodiment, the means for providing fluid communication includes a common housing that encloses the hydrocyclone and the products vessel, at least to the extent that the underflow outlet and the product vessel open to the interior of the housing. In such an embodiment, the common housing provides fluid communication between the underflow outlet and the products vessel so that a gas circulation pathway is created for the circulation of gases that form the vapor core within the hydrocyclone. More specifically, gases exiting the hydrocyclone via the overflow outlet pass through the products vessel and into the atmosphere within the housing. Gas from the interior of the housing is drawn into the hydrocyclone via the underflow outlet by the siphon effect described above.

In an embodiment where the hydrocyclone and products vessel are housed in a common housing, the separator apparatus will optionally but preferably comprise means for adjusting and/or controlling the pressure within the housing. Such means can include a source of a gas and a control system for sensing the housing pressure and directing gas into or out of the housing as needed to adjust and maintain a desired pressure within the housing. The gas can be an inert gas such as nitrogen or the like, but can also be a synthesis gas or other gas that contains reactants. Where the slurry contains catalyst to be recycled to an upstream reactor, the gas selected preferably will not significantly degrade or deactivate the catalyst. The control system can be manual in nature having one or more gauges for monitoring pressure and valving for directing gas into or out of the housing. Automated controls having a processor to monitor housing pressure and send signals to actuate valving may be preferred. Those skilled in the art will recognize other means for controlling pressure within a substantially gas-tight housing.

The housing pressure will depend in large part on the source of the slurry, the location of the separator apparatus in the process stream, and how the separated components will be used. For instance, where one or more slurry components are to be separated and recycled to an upstream reactor, it is preferred that the separator apparatus and the interior housing pressure be the same or substantially similar to the pressure in the upstream reactor. Such pressures can be greater than atmospheric, preferably greater than about 75 psig, more preferably greater than about 150 psig and still more preferably greater than about 250 psig. Where the slurry is derived from a Fischer-Tropsch reactor and the separated catalyst is to be recycled to that reactor, it is preferred that the means for adjusting and/or controlling the pressure within the housing be capable of adjusting the pressure so as to maintain an internal housing pressure between about 250 psig and about 700 psig.

Solids Vessel

An optional, but highly preferred component of the separator apparatus of the present invention is a solids vessel disposed downstream of the underflow outlet of the hydrocyclone. The solids vessel is configured and arranged to receive a solids-enriched slurry from the underflow outlet. The solids-enriched slurry can be removed from the solids vessel through an outlet in the lower section of the vessel for recycle to a point upstream, such as a reactor, or directed downstream for additional processing or use. In a preferred embodiment, the solids-enriched slurry will comprise catalyst solids for recycle to a Fischer-Tropsch reactor upstream from the separator apparatus. Further, the position and structure of the solids vessel should be such that a flow gas to the underflow outlet of the hydrocyclone is not prevented.

In an embodiment where the hydrocyclone and products vessel are housed in a common housing, the solids vessel can be spaced apart and below the underflow outlet so as to allow gas to flow to the underflow outlet. Preferably, such a solids vessel has an opening for receiving the solids-enriched slurry that is discharged from the underflow outlet. In such a configuration, the solids vessel will be enclosed, in whole or in part, within the housing that encloses the hydrocyclone and product vessel. Preferably, the housing encloses the underflow outlet, the products vessel and as least the opening of the solids vessel in order to provide the gas circulation pathway between the products vessel and the underflow outlet of the hydrocyclone.

In an alternate embodiment, the solids vessel can be connected to the hydrocyclone so that there is direct fluid communication between the underflow outlet and the solids vessel. This connection may be achieved by attaching the solids vessel to the lower section of the hydrocyclone, so that the underflow outlet is completely enclosed within a portion of the solids vessel. Alternatively, this direct fluid communication between the underflow outlet and the solids vessel can be achieved by providing a conduit that connects the underflow outlet to the solids vessel. In either of these embodiments, the means for providing fluid communication between the products vessel and the underflow outlet comprises a gas circulation conduit that connects the products vessel with the solids vessel. More preferably, this gas circulation conduit connects an upper portion of the products vessel with an upper portion of the solids vessel, thereby providing a gas circulation pathway between the two vessels.

In such a configuration, gases exiting the overflow outlet of the hydrocyclone are separated from the liquid components in the products vessel. The separated gases can then flow through the gas circulation conduit into the upper portion of the solids vessel. Here, in the space above the discharged solids-enriched slurry, the separated gases are available to be drawn into the hydrocyclone via the underflow outlet. Thus, a gas circulation loop is formed between the hydrocyclone, the products vessel and the solids vessel.

In an embodiment where the solids vessel is connected to the hydrocyclone so that there is direct fluid communication between underflow outlet and the solids vessel, the separator apparatus will optionally but preferably comprise means for adjusting and/or controlling the pressure within the gas circulation loop. Such means can include a source of a gas and a control system for sensing pressure and directing gas into or out of the gas circulation loop as needed to achieve and maintain a desired pressure. The gas can be an inert gas such as nitrogen or the like, but can also be a synthesis gas or other gas that contains reactants. Where the slurry contains catalyst to be recycled to an upstream reactor, the gas selected preferably will not significantly degrade or deactivate the catalyst. The control system can be manual in nature having one or more gauges for monitoring pressure and valving for directing gas into or out of the loop. Automated controls having a processor to monitor loop pressure and send signals to actuate valving may be preferred.

Alternate means for controlling and/or adjusting pressure within a substantially gas-tight vessel may also be used to advantage to adjust pressure within the gas circulation loop. Further, although this optional pressure control is sometimes described herein as being achieved by introducing or withdrawing gas from the solids vessel, those skilled in the art will recognize that gas may generally be introduced and/or withdrawn from one or more other locations along the gas circulation loop in order to control pressure on the slurry and separated slurry components.

The pressure within separator apparatus will depend in large part on the source of the slurry, the location of the separator apparatus in the process stream, and how the separated components will be used subsequently. For instance, where one or more slurry components are to be separated and recycled to an upstream reactor, it is preferred that the separator apparatus and the solids vessel be the same or similar to the pressure in the upstream reactor. Such pressures will be greater than atmospheric, preferably greater than about 75 psig, more preferably greater than about 150 psig and still more preferably greater than about 250 psig. Where the slurry is derived from a Fischer-Tropsch reactor and separated catalyst solids are to be recycled to that reactor, it is preferred that the means for adjusting and/or controlling the pressure be capable of adjusting the pressure so as to maintain a target pressure between about 250 psig and about 700 psig.

Heating Units

The separator apparatus of the present invention can be used to separate the components of a slurry at high temperature as well as high pressure. Where the slurry stream is derived from a high temperature source it may be desirable to maintain the elevated temperature of the slurry and/or separated components so as to achieve an efficient separation and to minimize temperature fluctuations on the process stream.

For instance, the composition of the slurry stream may require that the stream be maintained above a certain temperature so as to maintain certain components in a liquid or gas phase. In a preferred embodiment where the separator apparatus is used to separate the liquid reaction products from the catalyst solids in a slurry derived from a Fischer-Tropsch reactor, the liquid reaction products will comprise hydrocarbon waxes in the liquid phase. If these hydrocarbons cool below their melting point, they can agglomerate with the catalyst solids in the separator apparatus or in the slurry stream before entering the separator apparatus. In addition, where one or more separated components are to be recycled to a high temperature reactor, it may be desirable to maintain the elevated temperature of such components so as to minimize temperature fluctuations within that reactor.

As such, it is envisioned that the separator apparatus of the present invention may optionally comprise one or more heating units for maintaining the slurry or the separated slurry components at or above a certain temperature. In a preferred embodiment where the separator apparatus is used to separate components from a slurry derived from a Fischer-Tropsch reactor, any heating units used should be capable of maintaining the slurry and separated slurry components within the range of temperatures typically found in a Fischer-Tropsch reactor. Thus, it is preferred in such an embodiment that the slurry and separated slurry components will be maintained at a temperature within the range of about 250° F. to about 600° F., more preferably between about 300° F. and about 550° F., still more preferably between about 400° F. and about 500° F. The number and location of heating units that may be required to maintain such temperatures will primarily depend on the location of the separator apparatus in the process stream, e.g. relative to source of the high temperature slurry, the composition of the slurry and the desired phase of the separated components for subsequent processing or use.

Optional Upstream Components

As noted throughout, it is envisioned that the separator apparatus of the present invention will be located in a process stream downstream of a high pressure and/or high temperature reactor for separating the components of a slurry derived from that reactor. Therefore, it is envisioned that the slurry inlet of the hydrocyclone of the apparatus of the present invention will be connected to such a reactor for receiving a slurry from the reactor. Intermediate between a reactor port and the slurry inlet may be one or more optional components. Specifically, such optional components can include heating units as addressed above, degassing units, pumps and the like.

Where the slurry stream from such a reactor will contain products and unreacted reactants in the gas phase, a degassing unit may be desirable to remove such components so that the slurry inlet receives a degassed slurry. Degassing devices are well known in the art and may include any vessel, tank, drum, hydrocyclone or the like that will remove a major portion of the gases from a slurry, preferably without imposing a large pressure drop on the slurry stream.

As noted above, the operation of the hydrocyclone in a balanced mode may require adjustment of the volumetric flow rate of the slurry at the slurry inlet of the hydrocyclone, and one or more pumps may be used to advantage in controlling this flow rate. However, where the slurry stream is under pressure from a high pressure reactor located upstream of the separator apparatus, a pressure differential between the reactor and the separator apparatus can be used to create a hydrostatic pressure on the slurry sufficient to move the slurry through the separator apparatus without the use of pumps. Thus, the volumetric flow rate of the slurry into and through the separator apparatus can also be controlled by manipulating the pressure differential between the source of the slurry and the separator apparatus. Where pressure losses between a source of the slurry and the separator apparatus are to be minimized, the use of one or more pumps to control the volumetric flow rate of slurry into the separator apparatus is preferred. Other methods and means for controlling the flow rate of the slurry into the hydrocyclone are addressed below.

Methods of the Present Invention

The separation methods of the present invention include the steps of introducing a slurry comprising liquid and solid components into a hydrocyclone where the hydrocyclone has an underflow outlet and an overflow outlet, directing separated liquid components and gases through the overflow outlet and into a products vessel and providing fluid communication between the products vessel and the underflow outlet.

Preferably, the separation methods of the present invention further include the step of operating the hydrocyclone in balanced mode. The separator can be operated in balanced mode by adjusting the size of the underflow outlet, adjusting the volumetric flow rate at which slurry is introduced into the hydrocyclone, or a combination thereof. Adjustment of the underflow outlet can be achieved by utilizing a separator having an adjustable opening or annular weir about the underflow outlet as is described above.

Adjustment of the volumetric flow rate of the slurry entering the separator can be achieved directly through the use of pumps as noted above. Indirectly, the volumetric flow rate of the slurry can be controlled by creating and manipulating a pressure differential between an upstream reactor and the pressure within the separator. In addition, control over the volumetric flow rate of the slurry may be achieved by creating hydrostatic pressure on the slurry through the design of the process stream and the relative location of the hydrocyclone within that process stream. By way of example, where a degassing unit is utilized upstream from the separator apparatus, the degassing unit is preferably elevated a sufficient distance above the separation unit so that the hydrostatic pressure of the slurry column below the degassing unit is that which is required for proper operation of the hydrocyclone. Similarly, hydrostatic pressure can be created by positioning the slurry inlet a distance below the reactor port from which the slurry is removed from the reactor. Other means for controlling and adjusting the flow rate of a slurry entering a hydrocyclone are known.

The step of providing fluid communication between the products vessel and the underflow outlet can be achieved by enclosing at least a portion of the hydrocyclone and products vessel in a common housing. Note that even when the underflow outlet of the hydrocyclone is enclosed within a housing, the hydrocyclone is preferably operated in balance mode in order to achieve efficient separation of the slurry components. Where the slurry introduced into the hydrocyclone is at an elevated pressure, the method can also include the step of adjusting pressure within the housing to the elevated pressure on the slurry. Pressure within an enclosing housing can be greater than atmospheric, preferably greater than about 75 psig, more preferably greater than about 150 psig and still more preferably greater than about 250 psig. Housing pressure can be adjusted by introducing or removing gas from the housing such as is described in more detail above.

The methods of the present invention can further include the step of directing a solids-enriched slurry through the underflow outlet and into a solids vessel. In such an embodiment, the step of providing fluid communication between the products vessel and the underflow outlet can also be achieved by providing fluid communication between the products vessel and the solids vessel. Such methods also preferably include the step operating the hydrocyclone in balanced mode. Where the method includes the step of directing a solids-enriched slurry into a solids vessel and the slurry introduced into the hydrocyclone is at an elevated pressure, the methods can further include the step of adjusting pressure within the solids vessel to the elevated pressure on the slurry. Pressure within a solids vessel can be greater than atmospheric, preferably greater than about 75 psig, more preferably greater than about 150 psig and still more preferably greater than about 250 psig. Pressures can be adjusted by introducing or removing gas from the solids vessel as is described in more detail above.

It should further be noted that adjusting the pressure within the separator apparatus, whether within an enclosing housing or gas circulation loop, may be achieved by other means known to those skilled in the art. For instance, where isolated or direct fluid communication is provided by conduits between the hydrocyclone and solids vessel and between the solids vessel and the products vessel, pressure control need not be imposed merely through the solids vessel, but may also be controlled through manipulation of pressure within the gas circulation conduit, the products vessel or another element of the gas circulation loop that is formed between the hydrocylone, products vessel and solids vessel.

In a preferred process embodiment, the methods of the present invention are used to separate catalyst solids from a slurry derived from a Fischer-Tropsch reactor at high pressure and/or high temperature to obtain clarified liquid reaction products and a solids (catalyst) enriched slurry for recycle to the reactor. Typically, such a slurry would be under a reactor pressure of at least about 250 psig and less than about 700 psig. Further, such a slurry can be at high temperature between about 250° F. and about 600° F., more preferably between about 300° F. and about 550° F., still more preferably between about 400° F. and about 500° F. Thus, the separation methods of the present invention can further include the step of heating the slurry and/or one or more separated components so as to maintain the slurry or components in a desired state or phase.

DETAILED DESCRIPTION OF THE FIGURES

Figure 1:
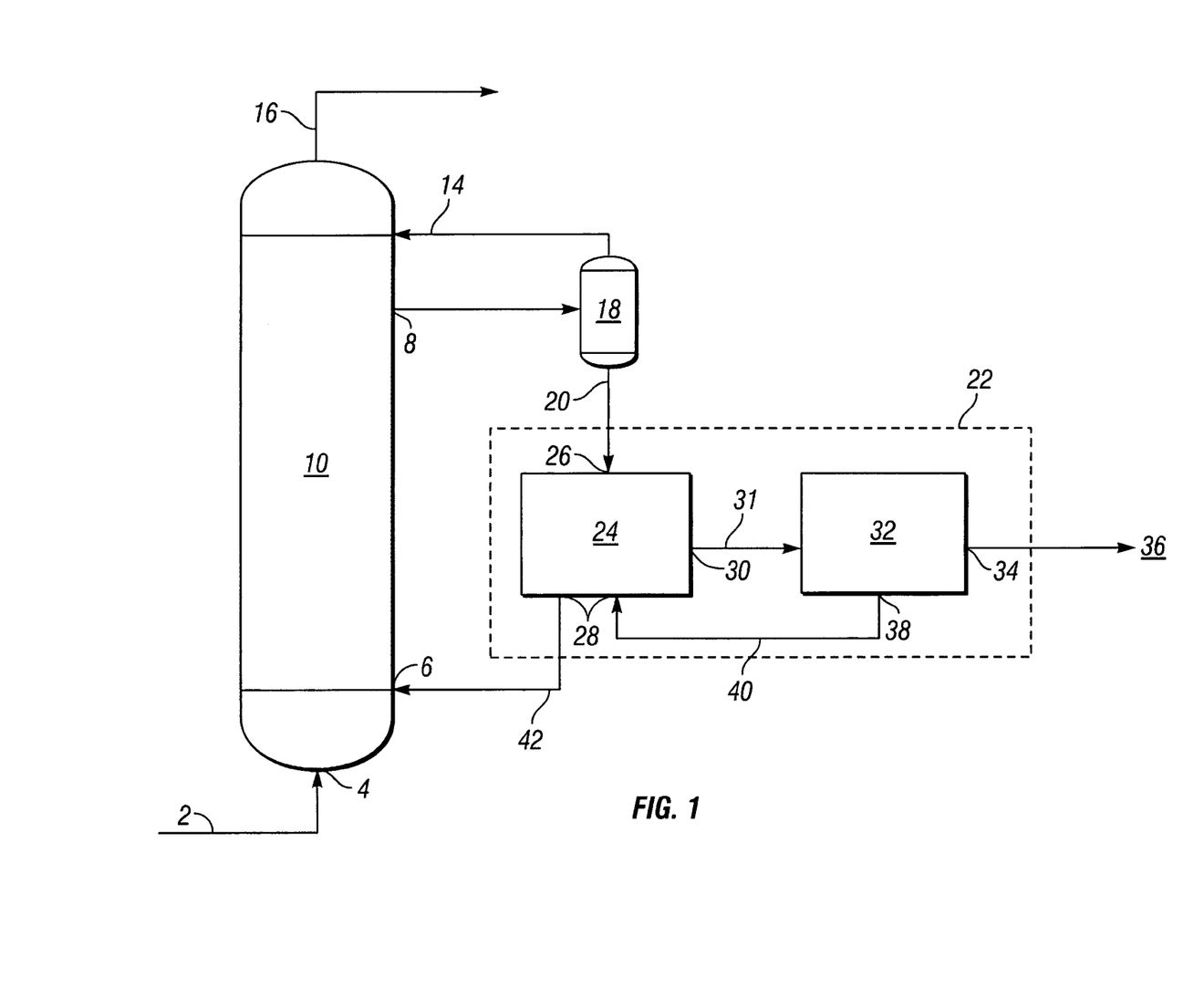
FIG. 1 is a schematic view of a reactor system integrated with a separator apparatus of the present invention.

With reference to FIG. 1, reactor vessel 10 is a Fischer-Tropsch reactor containing a slurry bed (not shown) that comprises solid catalyst, liquid and gas reaction products, and unreacted gas reactants. A portion of the reactor slurry is periodically or continuously removed from reactor 10 via line 8 and directed to degassing unit 18 where gaseous components are removed from the slurry and recirculated to reactor 10. The degassed slurry is then directed through line 20 to separator apparatus 22. The degassed slurry is directed through slurry inlet 26 into hydrocyclone 24. Within hydrocyclone 24, the slurry is separated into a solid-enriched slurry stream and a solid-depleted slurry stream. The solids-depleted stream comprises liquid reaction products and gases that have been drawn into hydrocyclone through underflow outlet 28. The solids-depleted stream exits hydrocyclone 24 via overflow outlet 30 and is directed into products vessel 32. Within products vessel 32, the solids-depleted slurry stream is allowed to separate into clarified liquid reaction products and gases. Separated liquid reaction products 36 exit the products vessel via outlet 34 and separated gas components exit products vessel 32 via outlet 38.

Gas circulation pathway 40 is provided between products vessel 32 and underflow outlet 28 by the fluid communication therebetween. Gas circulation path 40 enables the separated gas components to circulate back to underflow outlet 28 of hydrocyclone 24 where they are available to be drawn into the separator and facilitate the operation of the hydrocyclone in balanced mode. A solids-enriched slurry stream exits hydrocyclone 24 via underflow outlet 28 and is recirculated to the reactor slurry bed via slurry return line 42.

Figure 2:
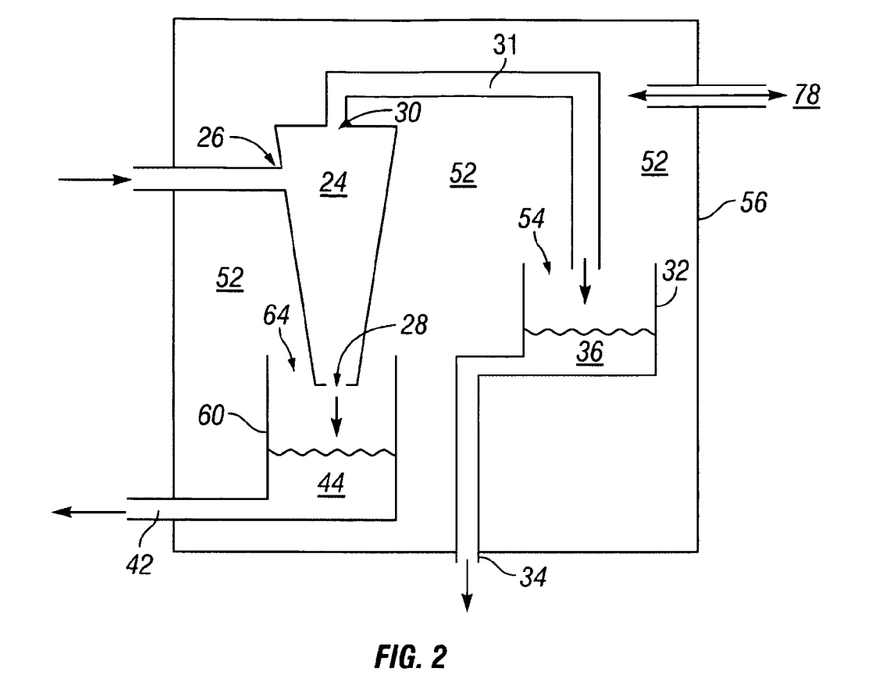
FIG. 2 is a schematic view of a preferred embodiment of a separator apparatus of the present invention.

FIG. 2 illustrates a preferred embodiment wherein the components of the separator apparatus are enclosed within a common housing so as to maintain an elevated pressure on the slurry and separated components while still being able to operate the hydrocyclone in balanced mode and to provide fluid communication between products vessel 32 and underflow outlet 28. As illustrated, hydrocyclone 24, products vessel 32 and solids vessel 60 are all contained within housing 50. Conduit 31 is provided for transferring the solids-depleted slurry stream from the overflow outlet 30 to products vessel 32. Housing 50 has pressure adjusting means 78 for adjusting the pressure within housing interior 52. Products vessel 32 has opening 54 to enable separated gas components to diffuse into housing interior 52. Similarly, solids vessel 60 has opening 64 to enable gases within the housing interior 52 to flow to underflow outlet 28 of hydrocyclone 24.

Figure 3:
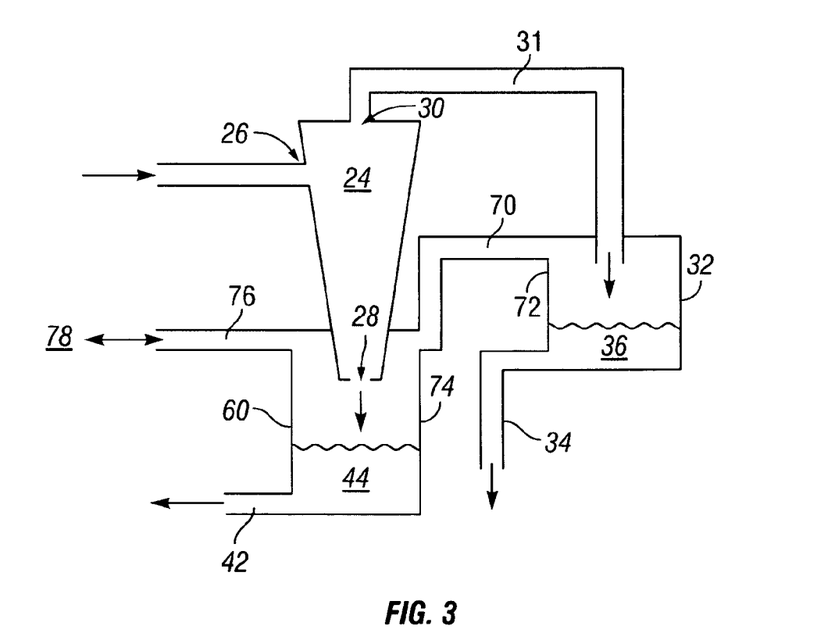
FIG. 3 is a schematic view of a preferred embodiment of a separator apparatus of the present invention.

In the alternative embodiment shown in FIG. 3, a gas circulation loop is formed between hydrocyclone 24, products vessel 32 and solids vessel 60. This gas circulation loop is closed by overflow conduit 31 that provides direct fluid communication between overflow outlet 30 and products vessel 32, gas circulation conduit 70 that provides fluid communication between products vessel 32 and solids vessel 60, and the enclosure of underflow outlet 28 within solids vessel 60. As illustrated, pressure adjusting means 78 is provided for controlling the pressure within solids vessel 60 and this gas circulation loop.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. Apparatus for separating components of a slurry, the apparatus comprising:
    a hydrocyclone for receiving a slurry comprising liquid and solid components, the hydrocyclone having a slurry inlet, an underflow outlet, an overflow outlet and an inner wall having a circular cross sectional shape;
    a products vessel configured to receive a portion of the liquid components and gases from the overflow outlet; and
    means for providing fluid communication between the products vessel and the underflow outlet wherein the means for providing fluid communication comprises a housing enclosing the hydrocyclone and the products vessel, and wherein the products vessel and the underflow outlet are open to the interior of the housing.

2. The apparatus of claim 1, further comprising means for adjusting pressure within the interior of the housing.

3. Method for separating components of a slurry, the method comprising:
    introducing a slurry comprising liquid and solid components into a hydrocyclone, the hydrocyclone having an underflow outlet and an overflow outlet;
    directing separated liquid components and gases through the overflow outlet and into a products vessel; and
    providing fluid communication between the products vessel and the underflow outlet wherein fluid communication between the products vessel and underflow outlet is provided by enclosing the hydrocyclone and products vessel in a common housing.

4. The method of claim 3, further comprising the step of operating the hydrocyclone in balanced mode.

5. The method of claim 3, further comprising the step of adjusting pressure within the housing.

6. The method of claim 5, wherein the slurry introduced into the hydrocyclone is at an elevated pressure and the pressure within the housing is adjusted to about the elevated pressure.

* * * * *